April 3, 1956  E. KOMUSIN  2,740,581
DEVICE FOR DISPENSING TICKETS
Filed July 5, 1952  11 Sheets-Sheet 1

INVENTOR
Erich Komusin

April 3, 1956

E. KOMUSIN 2,740,581

DEVICE FOR DISPENSING TICKETS

Filed July 5, 1952

INVENTOR
Erich Komusin

April 3, 1956 E. KOMUSIN 2,740,581
DEVICE FOR DISPENSING TICKETS
Filed July 5, 1952 11 Sheets-Sheet 5

INVENTOR
Erich Komusin

April 3, 1956

E. KOMUSIN

2,740,581

DEVICE FOR DISPENSING TICKETS

Filed July 5, 1952

INVENTOR
Erich Komusin

April 3, 1956  E. KOMUSIN  2,740,581
DEVICE FOR DISPENSING TICKETS
Filed July 5, 1952  11 Sheets-Sheet 7

INVENTOR
Erich Komusin

April 3, 1956   E. KOMUSIN   2,740,581
DEVICE FOR DISPENSING TICKETS
Filed July 5, 1952   11 Sheets-Sheet 8

INVENTOR
Erich Komusin

April 3, 1956  E. KOMUSIN  2,740,581
DEVICE FOR DISPENSING TICKETS
Filed July 5, 1952  11 Sheets-Sheet 9

FIG.16

INVENTOR
Erich Komusin

April 3, 1956      E. KOMUSIN      2,740,581

DEVICE FOR DISPENSING TICKETS

Filed July 5, 1952      11 Sheets-Sheet 10

INVENTOR
Erich Komusin
by

United States Patent Office 2,740,581
Patented Apr. 3, 1956

2,740,581

DEVICE FOR DISPENSING TICKETS

Erich Komusin, Frankfurt am Main, Germany

Application July 5, 1952, Serial No. 297,308

Claims priority, application Germany July 7, 1951

18 Claims. (Cl. 235—31)

The present invention relates to a device for dispensing tickets of different values. The term "ticket" as used herein shall embrace any paper or cardboard label having a certain monetary value, such as railway ticket, admission ticket, postage stamp, insurance stamp, rebate voucher, etc.

It is an object of the invention to provide an improved device for dispensing tickets, which is simple in construction and easily operable by a user.

It is another object of the invention to provide such a device comprising means for selecting the value of the ticket and further means for selecting the number of pieces of tickets of each particular value.

It is another object of the invention to provide such a device having a plurality of means for selecting the value of the ticket, each such selecting means corresponding to one value, and a single further means common to all the values for selecting the number of pieces of tickets of each particular value.

It is still another object of the invention to provide such a dispensing device having a counting mechanism for adding up the total value of the tickets dispensed on each operation and a further counting mechanism for forming the grand total of all the tickets dispensed during a certain period.

It is still a further object of the invention to provide such a device having an electric impulse sender for electrically actuating the counting means.

It is another object of the invention to provide such a device in which the electric circuit is changeable for easily adapting the dispensing device to changing price conditions of the tickets.

It is a further object of the invention to provide such a device which is combined with a slot machine mechanism whereby tickets are only dispensed after an appropriate amount of coins has been inserted into the device.

These and other objects and advantages of the invention will become apparent from the following detailed description of some embodiments of the invention when read in conjunction with the accompanying drawings, in which:

The dispensing device comprises a plurality of casings in each of which tickets of the same value are stored, said casings being easily exchangeable.

More specifically, each casing surrounds a storage roller 101 carrying a strip of interconnected tickets of the same value. Each storage roller 101 is mounted on a spindle 102 held in a slot 103 of one of a plurality of side walls 112. Each strip of tickets, when drawn from one of the storage rollers 101, is guided by guide rollers 104 and 107 to a feed roller 105 carrying a plurality of rows of pins 106 arranged for entering into perforations in the strip of tickets, the perforations separating the individual tickets of the strip from one another. A leaf spring 109 holds the strip of tickets against the periphery of the feed roller 105. The spring 109 is fixed to a tiltable protecting member 108 and can be lifted together with the same, whereby the strip of tickets lying on the feed roller 105 becomes accessible from the front.

A swivelling member 110 is tiltably mounted in side walls 112. A nose 111 on member 110 projects into the path of studs 113 on the feed roller 105, which studs, on rotation of the feed roller 105, periodically tilt the swivelling member 110. While the swivelling member is being tilted, the strip of tickets lying on the feed roller 105 is lifted out of engagement with the pins 106 by the studs 113.

Each feed roller 105 idles on a shaft 115 to which a gear wheel 116 is keyed which meshes with a gear wheel 117 of an electro-magnetically controlled drive. By means of an intermediate shaft 118, the gear wheel 117 is connected to a ratchet wheel 119 operable by a pawl 122 fixed to an armature 120 of an electro-magnet 121. Each time the electro-magnet 121 is being excited, pawl 122 steps ratchet wheel 119 forward by one tooth and thereby rotates the shaft 115 by one step.

Figures 3, 4:
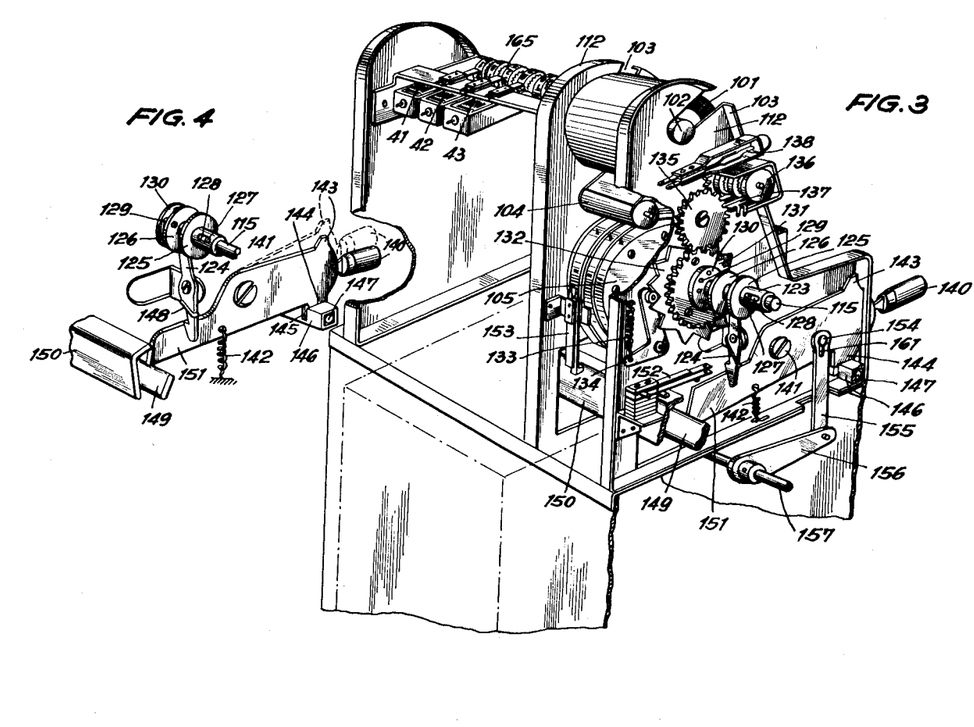
Fig. 3 is a perspective side view of the dispensing device of Fig. 1.
Fig. 4 illustrates one of the means for selecting the value of the ticket.

A sleeve 123 provided on the shaft 115 at the side of each feed roller 105 is axially displaceable relatively thereto (Figs. 3 and 4). Sleeve 123 is displaceable by means of a lever 124 having two arms whose function is to select the kind of ticket according to its value, one end of lever 124 being arranged between two discs 125 and 126 fixed to the sleeve 123. The sleeve 123 is rotatable together with the shaft 115 by virtue of a pin 127 on said shaft engaging an oblong hole 128 in said sleeve. The disc 126 is provided with coupling pins adapted to enter holes 129 in a coupling disc 130 when the sleeve 123 is correspondingly displaced, the coupling disc 130 being connected to the feed roller 105. A gear wheel 131 and a ratchet wheel 132 are keyed to the coupling disc 130 and to the feed roller 105. A lever 134 loaded by a spring 133 cooperates with ratchet wheel 132 and secures the feed roller 105, on being stepped forward, in its correct final position. A further gear wheel 135 actuating a mechanical counting device 136 (see also Figs. 5 and 6) meshes with the gear wheel 131. A separate counting device 136 is allocated to each storage roller 101 for storing tickets of one value. Each time a ticket is dispensed, the counting device 136 is stepped forward by one step and may, according to requirements, thus indicate either the number of tickets of the respective value dispensed, or else the number of such tickets still remaining on the respective storage roller 101. By means of projections, the counting device 136 operates electric contact springs 137 in a manner which is known per se whereby an electric circuit for a signalling lamp 138 is closed when the storage roller 101 is exhausted.

Lever 124 is controlled by a key lever 140 (Figs. 3, 4, 5 and 6) for selecting tickets of a certain value, said key lever 140 being rotatable around a pivot 141 and loaded by a spring 142. The movement of the key lever 140 is limited in one direction by a projection 143 abutting against a portion of the frame of the device, and in the other direction by a projection 144 engaging a slot 145 in a cage 146 housing rollers or balls 147. The cage 146 is common to all the key levers 140 for all the tickets of different values. The clearance or play between the rollers or balls 147 inside of cage 146 is such that only the projection 144 of a single key lever 140 can enter the cage 146 at a time. When one of projections 144 has entered the respective slot 145 in cage 146 and through such slot the cage 146 proper, the rollers or balls 147 are urged closely towards one another so that operation of another key lever 140 corresponding to a ticket of a different value is prevented.

On operation of one of the key levers 140, the corresponding lever 124 is rotated against the action of its spring 148 and displaces the corresponding sleeve 123 to its coupling position.

Two tiltable rails 149 and 150 are common to all the key levers 140. When one of the key levers 140 has been operated, its rear end 151 is lifted, and the rail 149 then positions itself under and supports rear end 151 so that it supports the free end 151. In this position, the key lever 140 operates a set of contact springs 152 (Fig. 3) associated with it. Simultaneously, the common rail 150, which is angular, is rotated by the lifted rear end 151 of the respective key lever 140, the rail 150 acting on contact springs 153 which are common to all the key levers 140. The contact springs 153 prepare an electric circuit for the driving electromagnet 121.

Figures 10, 12:
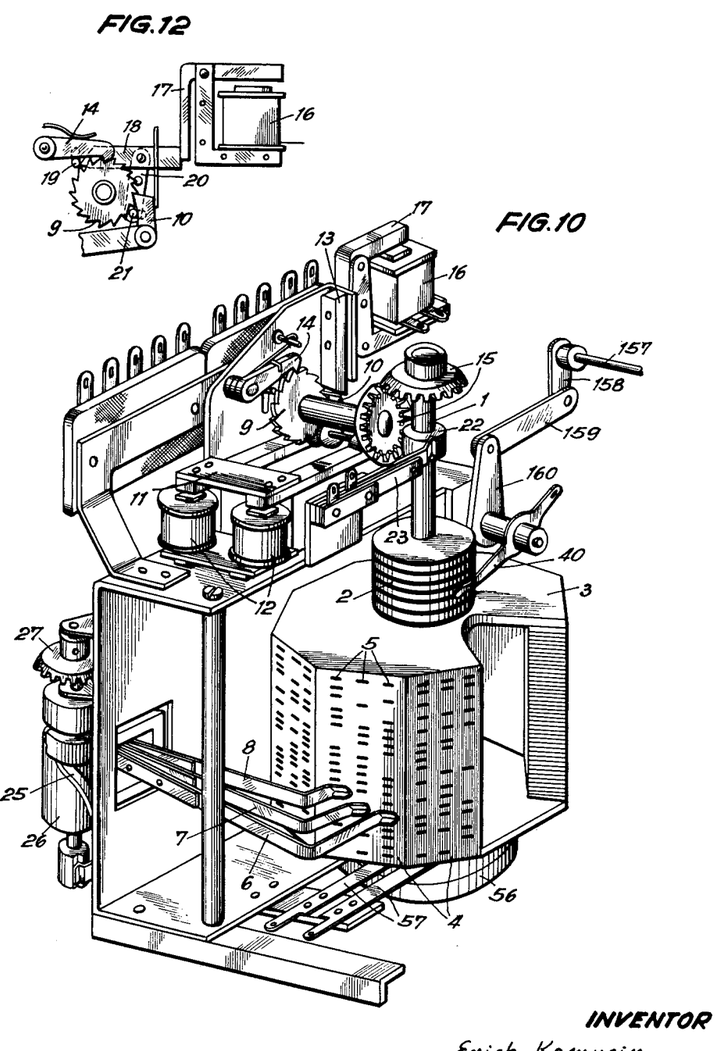
Figs. 10 and 11 are perspective views seen from different directions of electric means for controlling counting devices of the arrangement.
Fig. 12 illustrates a device for actuating switching and blocking pawls for the arrangement of Figs. 10 and 11.
Figures 11, 13:
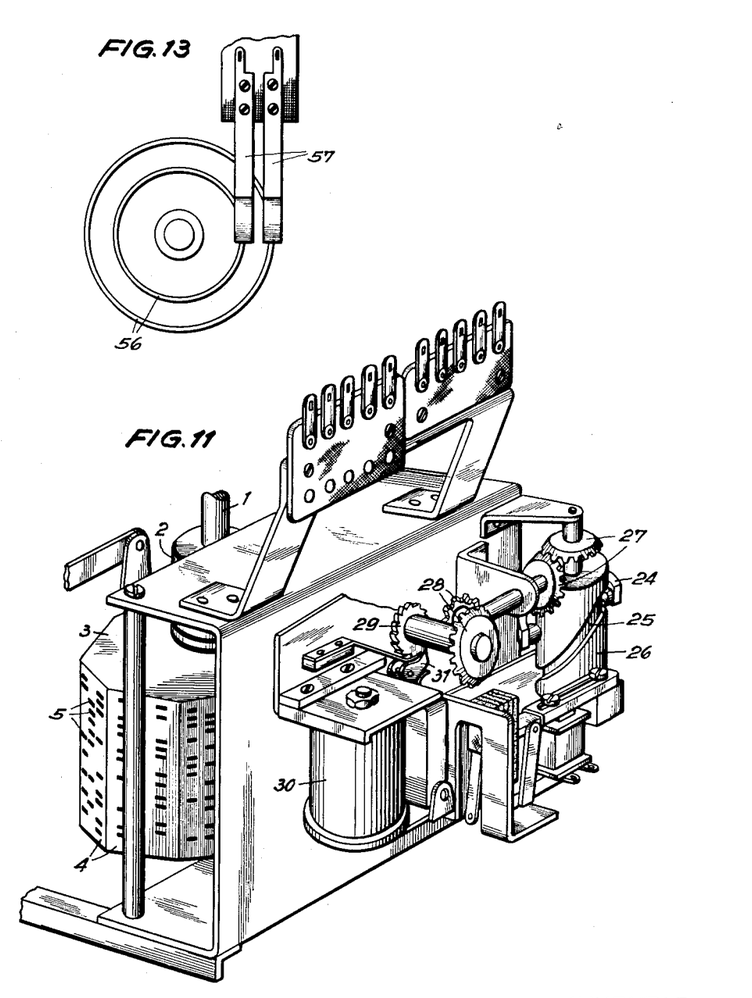
Fig. 13 illustrates the current feed to a switching drum of the arrangement of Figs. 10 and 11.
Figures 14, 15:
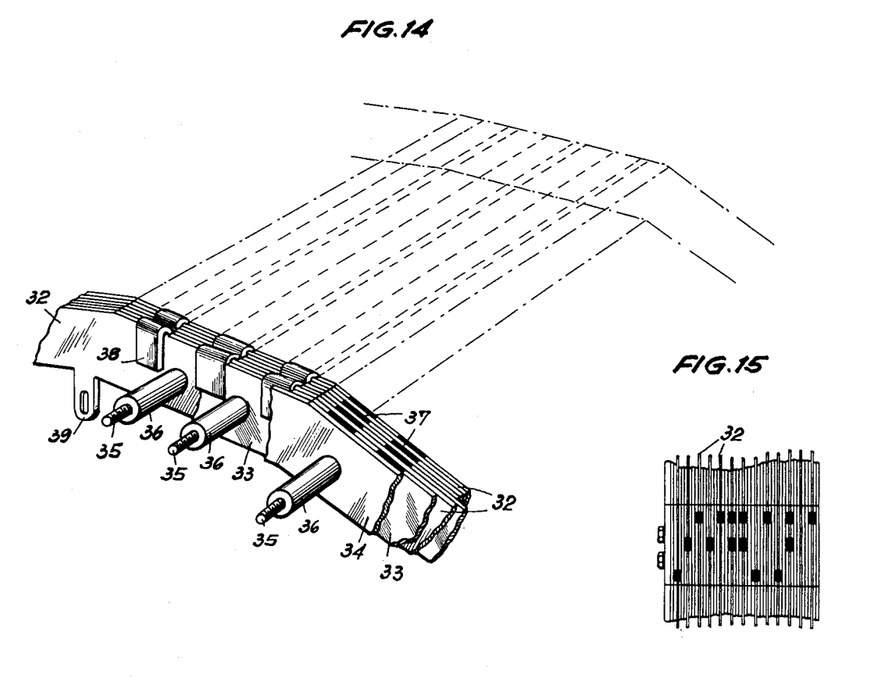
Fig. 14 illustrates contact segments of the switching drum of the arrangement of Figs. 10 and 11.
Fig. 15 illustrates a portion of a row of contacts of the switching drum of the arrangement of Figs. 10 and 11.

A shaft 157 is coupled to each key lever 140 by means of a lever arrangement 155, 156 hinged to a pin 154 on the key lever 140. Lever arrangement 158, 159, 160, connects the shaft 157 to a wiper 40 of a switching mechanism (Fig. 10). The link 155 (Fig. 3) of the lever arrangement 155, 156 has an oblong hole 161, the length of which is different for each key lever 140. Consequently, each key lever 140, on being actuated, rotates the wiper 40 of the switching mechanism (Fig. 10) through a different angle. The switching mechanism comprises a plurality of contact rings 2 across which the wiper 40 is movable and each of which is allocated to one of the key levers 140.

Figures 1, 2:
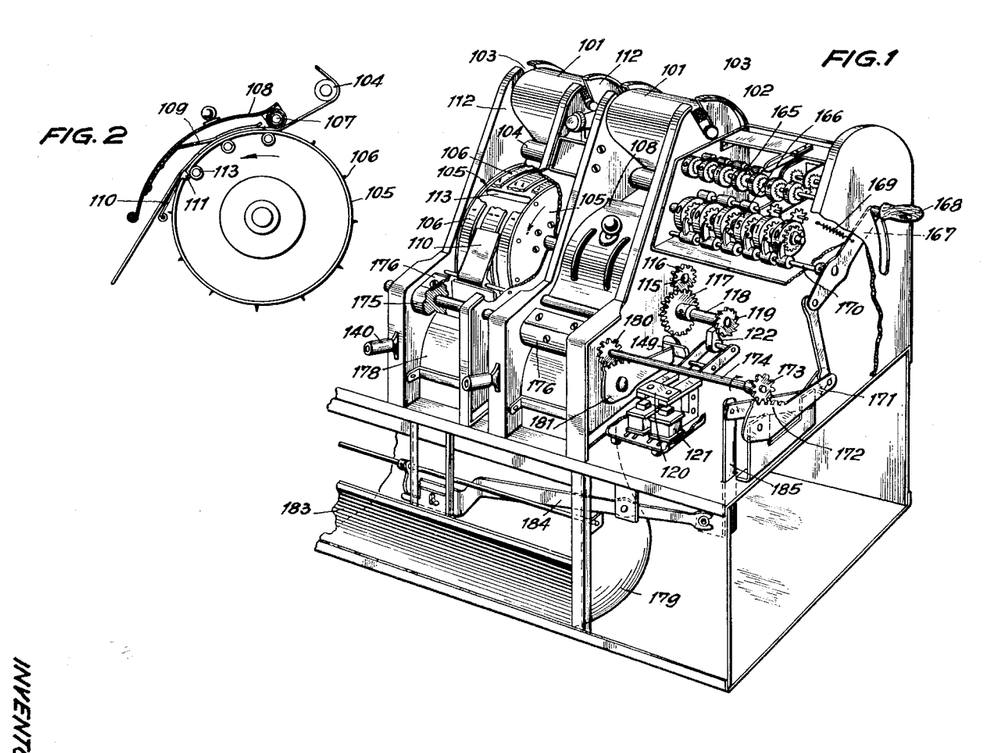
Fig. 1 is a perspective front view of a dispensing device embodying the invention after a protective covering or hood thereof has been removed.
Fig. 2 illustrates a roller of the device of Fig. 1 for feeding tickets of one value.

Two counting devices 165 and 166 are provided (Figs. 1, 5 and 6) adjacent the casings for receiving the tickets.

The counting device 166 is constructed to indicate the sum of the values of the tickets dispensed on each operation and is manually zeroisable in any known manner. The counting device 165 is constructed to count the grand total of the values of all the tickets dispensed during a certain period. Both counting devices are electromagnetically operable in accordance with the values of the tickets dispensed. Fig. 3 illustrates only electromagets 41, 42 and 43 for operating the counting device 165. For zeroising the counting device 166, a manually operable lever 167 (Fig. 1) is provided, which has an operating handle 168 accessible from outside the dispensing device. The lever 167 is rotatable against the action of a spring 169. On rotation of the lever 167, a shaft 170 is rotated which carries projections for zeroising the counting device 166. The lever 167 is tied to a lever 171 provided with a toothed segment 172 meshing with a toothed wheel 173 keyed to a shaft 174 so that, on each operation of the lever 167, the shaft 174 is rotated through a certain angle. Discs 175 keyed to the shaft 174 carry knives 176, each arranged in front of one of the strips of tickets of different values. When, by virtue of rotation of the feed roller 105, the strip of tickets of one value has been drawn from the respective storage roller 101, the free end of the said strip extends downwards along the swivelling member 110. When subsequently, on manual operation of the lever 167, the shaft 174 is rotated, the strip is cut by the respective knife 176 at the end of the swivelling member 110 and drops along a guide 178 into a dispensing chute 179 (see also Figs. 5 and 6).

Normally, the dispensing chute 179 is shut by a slide or lid 183 so that the user cannot reach any of the ticket strips with his fingers. The slide 183 is mounted on a lever 184 connected to the lever 171 by a rod 185, the lever 171 being movable by the zeroising lever 167. Consequently, the slide 183 is removed from and opens the dispensing chute 179 only on operation of the lever 167 and the cutting knives 176. Simultaneously therewith, the counting device is zeroised.

On rotation of the shaft 174, a toothed wheel 180 keyed thereto rotates a lever 181, a toothed segment of which meshes with the toothed wheel 180. The free end of the lever 181 acts upon rail 149 and tilts the same, whereby the last operated key lever 140 is released and returns to its initial position under the action of its spring 142.

Figure 5:
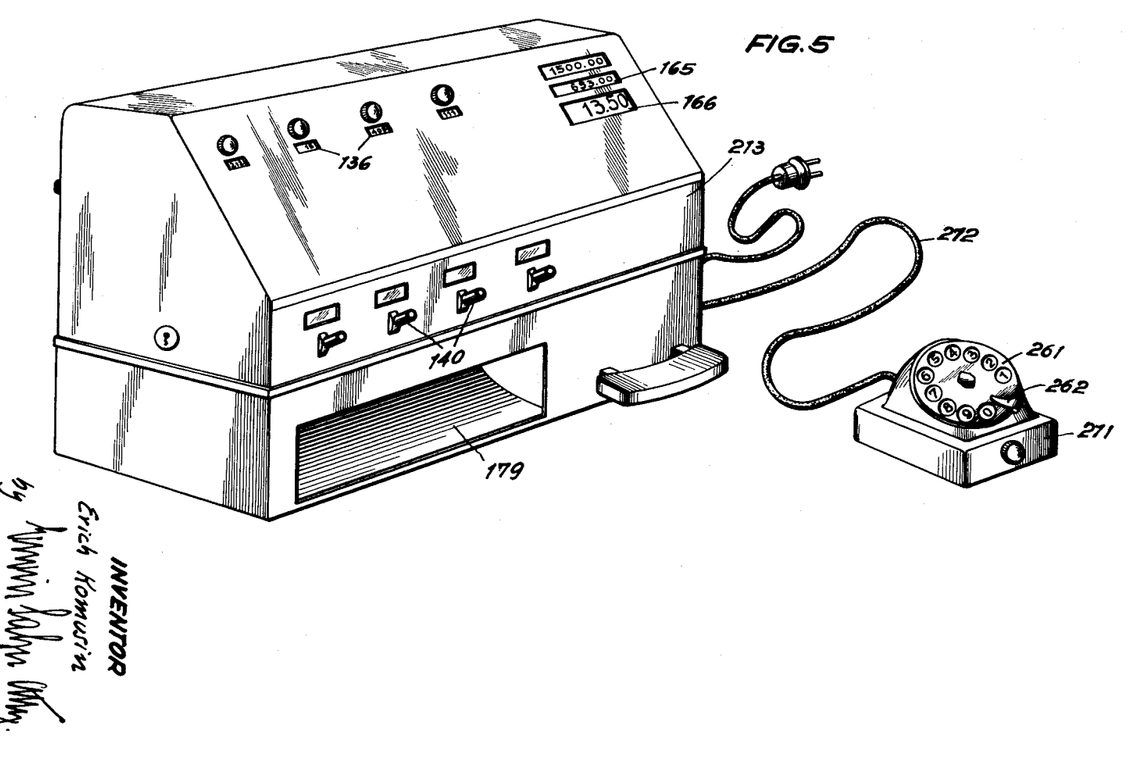
Fig. 5 is a perspective view of the dispensing device with its protective covering or hood and of a separate electric current impulse sender.
Figure 6:
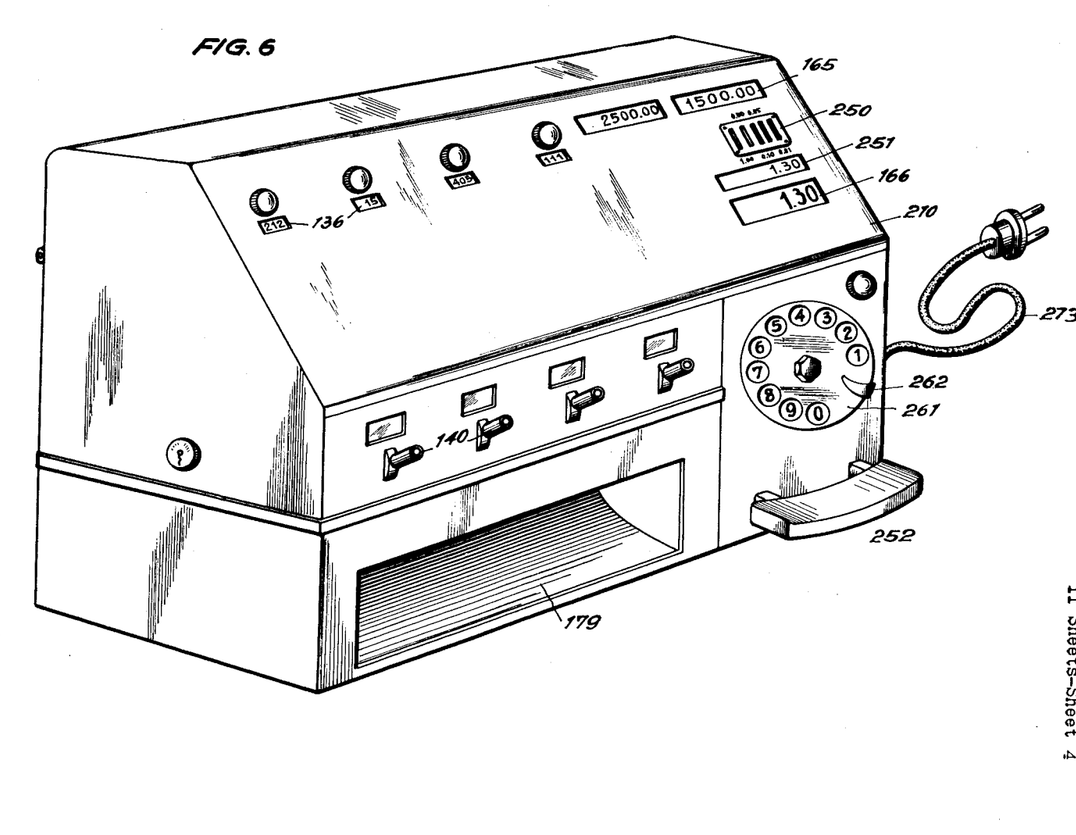
Fig. 6 is a similar perspective view of a dispensing device combined with a slot machine mechanism and built-in electric current impulse sender.
Figure 7:
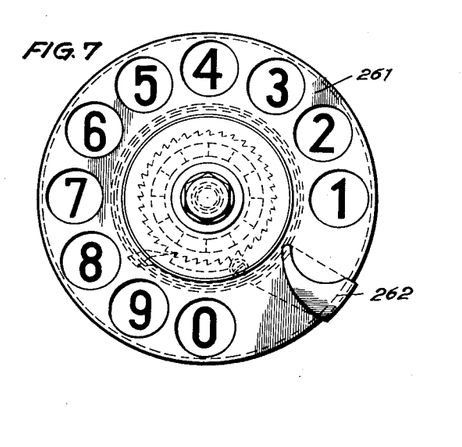
Fig. 7 is a front view of the electric current impulse sender.
Figure 8:
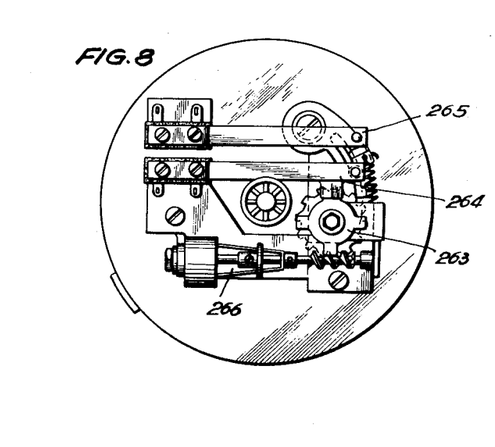
Fig. 8 is a rear view of the electric current impulse sender.
Figure 9:
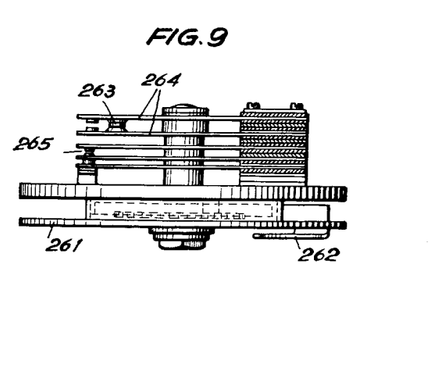
Fig. 9 is a side view of the electric current impulse sender.

For rotating one of the feed rollers 105, a number of current impulses corresponding to the number of tickets of the respective value to be dispensed are transmitted to the electro-magnet 121. Such current impulses are generated by means of an impulse sender (Figs. 5, 6, 7, 8 and 9) constructed analogously to the impulse senders of the type generally used in automatic telephony. The impulse sender comprises a dial 201 which, on tensioning, is rotated against the action of a spring (not shown) until the finger of an operator reaches an abutment 202. On release, the dial 201 returns through a corresponding angle into its initial position. During such return movement, an impulse wheel 203 is rotated which acts on contact springs 204 to close and open an electric circuit in accordance with the number which has been dialled. The speed of the return movement of the dial is controlled by a centrifugal brake 205. The dial 201 may be directly built into a housing 210 of the dispensing device (Fig. 6). Alternatively, the dial 201 may be provided on a separate stand 211 connected by an electric flex or cable 212 to a housing 213 of the dispensing device (Fig. 5).

For operating the electro-magnets 41, 42, 43 of the counting device 165 (Fig. 3) according to the value of the tickets to be dispensed in each case, a switching mechanism is provided which is illustrated in Figs. 10 to 16.

The switching mechanism comprises a rotatable shaft 1 (Fig. 10) carrying the contact rings 2 and a switching drum 3. The switching drum 3 is polygonal and accordingly comprises a plurality of plane side walls 4 which are parallel to the axis of the drum 3, each of the side walls 4 being provided with three rows of contact members 5. By suitably rotating the switching drum 3, each of its side walls 4 can be brought into the range of movement of three wipers 6, 7 and 8 so that said wipers, when moving in axial direction of the drum 3, sweep across the rows of contact members 5 of the respective side wall 4.

Rotation of switching drum 3 for selecting one of its side walls 4 is effected by means of a ratchet wheel 9 co-operating with a pawl 10 actuatable by an armature 11 of an electro-magnet 12. Each time the armature 11 is attracted, the pawl 10 rotates the ratchet wheel 9 in anti-clockwise direction (when viewed as shown in Fig. 10) by one tooth, the stroke of the pawl 10 being limited by an abutment 13 terminating the movement of the pawl 10. A second pawl 14 prevents back movement of the ratchet wheel 9. By means of crown wheels 15, the ratchet wheel 9 is geared to the rotatable shaft 1 of the switching drum 3. During rotation of the switching drum 3 under the action of the electro-magnet 12, a return spring (not shown) is tensioned which automatically returns the switching drum 3 into its initial position when both pawls 10 and 14 are simultaneously disengaged from the ratchet wheel 9.

Electro-magnet 16 (Fig. 12) is provided for disengaging pawls 10 and 14 from the ratchet wheel 9. Armature 17 of electro-magnet 16 is adapted to trip a lever 18, whereby a cam surface on lever 18 abuts against a pin 19 and raises the same to disengage pawl 14 from the ratchet wheel 9. A pin 21 is fixed to an extension 20 of lever 18 and acts upon pawl 10 to also disengage this pawl from the ratchet wheel 9. While the pawls 14 and 10 are both released, the ratchet wheel 9 is rotated in a clockwise direction by the switching drum 3 returning to the initial position thereof under the action of its return spring. Shaft 1 of the switching drum 3 supports a cam disc 22 which adapted to control contact springs 23 the contact between which is opened when the drum 3 is in its initial position.

In order to reach individual contact members of the rows of contact members 5 on each side wall 4 of the switching drum 3, it is necessary for the wipers 6, 7 and 8 to be moved in the axial direction of the switching drum 3. The wipers 6, 7 and 8 are tiltably mounted on, and connected to, a guide member 24 (Fig. 11) engaging a cam surface 25 in a cylinder 26. During a complete revolution of the cylinder 26, the wipers 6, 7 and 8 are moved across the rows of contact members 5 in the axial direction of the drum 3 first in one and then in the opposite sense. The arrangement is such that during the axial movement in one sense the wiper 8 is lifted from and only wipers 6 and 7 engage the contact members 5 of the respective rows of contact members, while during the movement in the opposite sense the wipers 6 and 7 are lifted from and only the wiper 8 engages the contact members 5 of the corresponding row of contact members. The rotation of the cylinder 26 in step-by-step fashion is caused by an electro-magnetically controlled drive. Cylinder 26 is coupled by crown wheels 27 and 28 to a ratchet wheel 29 co-operating with a pawl 31 actuated by the armature of an electro-magnet 30.

The switching drum 3 is composed of a plurality of electrically conducting strips 32 (Fig. 14) which, together with intermediate electrically insulating strips 33 and 34, form a staple. The staple is held together by clamping screws 35, which are insulated from the electrically conducting strips 32 by electrically insulating sleeves 36.

Each of the electrically conducting strips 32 lies between two insulating strips 33. The latter are provided with recesses 37 allowing electrically conducting U-shaped metal members 38 of the same thickness as the electrically insulating strips 33 to be inserted. Members 38 are inserted in such a way into recesses 37 that they straddle, and are in electric contact with, the respective electrically conducting strip 32 at the region of the respective recesses 37. The U-shaped members 38 form the members of the rows of contact members 5 (Fig. 10) which are swept by the wipers 6, 7 and 8. Each U-shaped member 38 is separated from the adjacent strips 33 provided with the recesses 37 and from the next adjacent U-shaped member 38 by one of the insulating strips 34, whereby electric contact between adjacent U-shaped members 38 is prevented. Each electrically conducting strip 32 is provided with a soldering tag 39 for connection to an electric current conducting wire.

Each of the three rows of contact members 5 (hereinafter distinguished from each other by the reference numerals 51, 52 and 53, Fig. 16) is allocated to a digit of a multi-digit number. Accordingly, the wiper 6 co-operating with the row of contact members 51 is electrically connected to the electro-magnet 41 for driving a number wheel indicating the first digit, that is to say the unit value of the multi-digit number. The wiper 7 co-operating with the row of contact members 52 is electrically connected to the electro-magnet 42 for driving a number wheel indicating the second digit, that is to say the tens value of the said number, and the wiper 8 co-operating with the row of contact members 53 is electrically connected to the electro-magnet 43 for driving a number wheel indicating the third digit, that is to say the hundreds value of the number. In each of the rows of contact members 51, 52 and 53 up to ten contacts are electrically marked so that when the respective wiper sweeps across the respective row of contact members, a number of current impulses corresponding to the number to be indicated by the counting device is established for setting the number wheels of the electromagnetically controlled counting device.

Switching drum 3 is not only composed of ten electrically conducting metal strips 32, but the plurality of metal strips 32 equals a multiple of ten, said multiple corresponding to the number of possible different values of the tickets. The electrically conducting strips 32 are electrically interconnected to form a plurality of groups of ten strips each, each group of strips being connected to one of the contact rings 2 co-operating with the wiper 40 coupled to the key lever 140 for selecting the value of the tickets to be dispensed.

Figure 16:
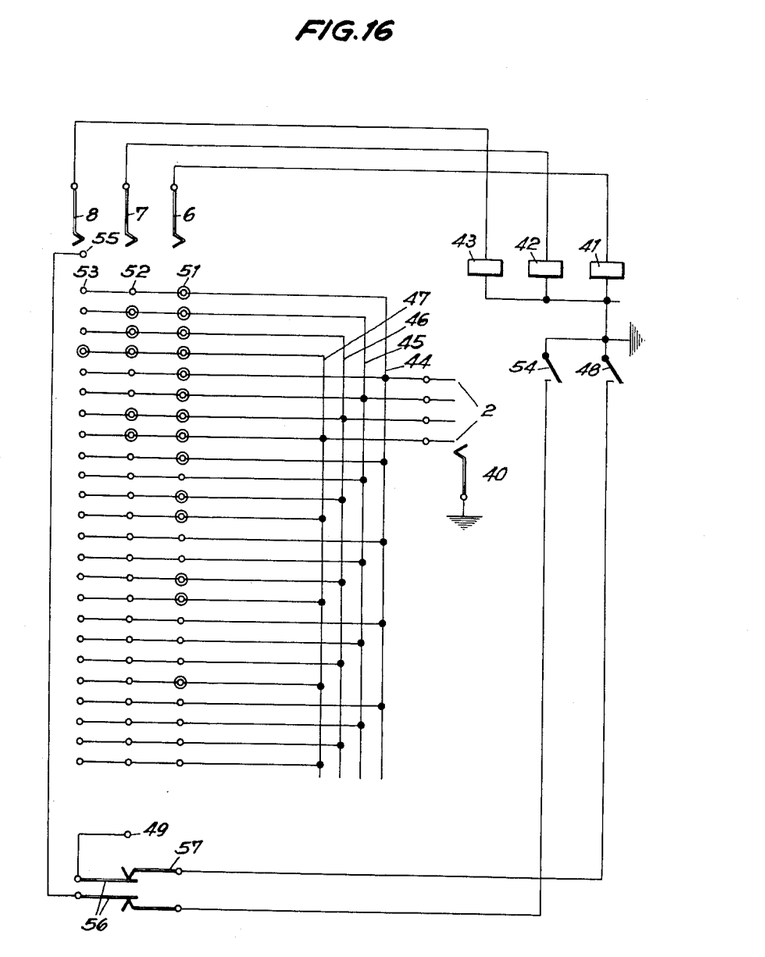
Fig. 16 is a circuit or wiring diagram of the arrangement of Figs. 10 and 11.

Circuit diagram of Fig. 16 has been drawn on the assumption (by way of example) that tickets of four different values are to be dispensed. Accordingly, four bus bars 44, 45, 46 and 47 are shown, which are respectively connected to four of the contact rings 2 (Fig. 10) and are selected by suitably positioning the wiper 40 on actuating the appropriate key lever 140.

For example, bus bar 44 may correspond to the numerical value 3. Accordingly, three members of the row of contact members 51, which corresponds to the first digit, are characterized by the provision of a U-shaped member 38 connected to the bus bar 44. When the wiper 40 places an electric potential on to said three members by means of the bus bar 44, the driving electro-magnet 41 receives three current impulses while the wiper 6 sweeps once across said row. In the example illustrated the bus bar 45 corresponds to the numerical value 12, the bus bar 46 to the numerical value 24, and the bus bar 47 to the numerical value 125. This circuiting of the rows of contact members is effected by insertion of current the conducting U-shaped members 38 (Fig. 14) at the corresponding regions of the conducting strips 32 which are rigidly connected in groups to the contact rings 2. In the circuit of Fig. 16 each current conducting U-shaped member is indicated by an additional circle at the place of contact.

The driving electro-magnet 41 for the first digit when stepping from 9 to 0 closes a contact 48 which places an electric potential on an additional contact 49 in the row of contact members 52. Number wheels 203 to 208 of the counting device (Fig. 17) are idling on a spindle 202 mounted in a frame 201. The number wheels 203, 204 and 205 of the lower digits are stepped forward, by the electro-magnets 41, 42 and 43 each by one. This electro-magnet drive is constructed in the manner of electric counting devices of the type used in electric telephone subscribers' meters. The armature of the electro-magnet 43, for example, engages a pinion 212 meshing with an intermediate toothed wheel 215 arranged on an auxiliary spindle 214, the intermediate toothed wheel 215 meshing with a further toothed wheel 216 connected to the number wheel 205. The electro-magnets 41 and 42 are analogously arranged for driving the number wheels 203 and 204, respectively. Thus, the number wheels 203, 204 and 205 can be stepped forwards independently from one another by their respective driving electro-magnets 41, 42 and 43.

The number wheel 205, after each complete revolution, actuates a transfer mechanism (not shown), which acts on pins 217 of the number wheel 206 to rotate the same through one step on each transfer. Corresponding transfer mechanisms (not shown) step the wheels 207 and 208 forward after each complete revolution of the respective preceding number wheel.

Figures 17, 18:
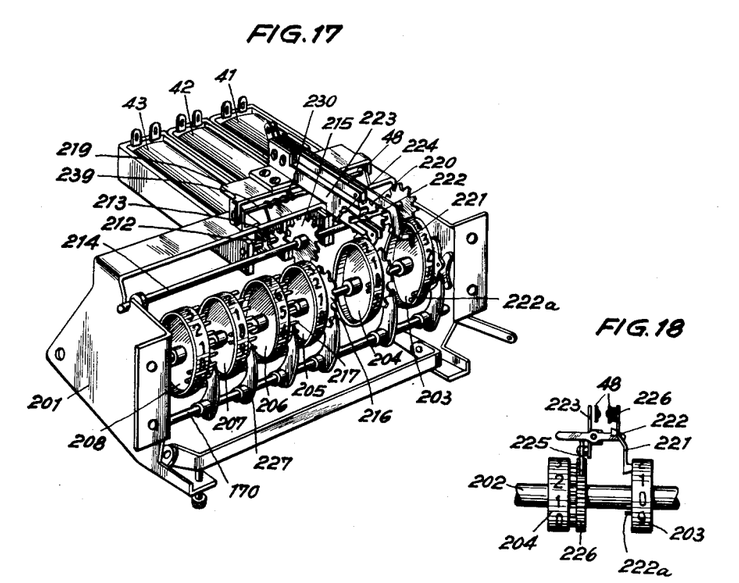
Fig. 17 illustrates an electro-magnetically controlled counting device.
Fig. 18 illustrates numbering wheels of two decadic positions of the counting device.
Figure 19:
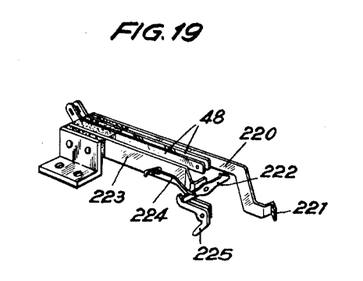
Fig. 19 illustrates a contact switch of a transfer mechanism of the counting device.

For each of the number wheels 203, 204 and 205 for the lower digits, which number wheels are directly driven by the electro-magnets 41, 42 and 43, respectively, a set of contacts 48 and 54 is provided. In Figs. 17 to 19, only the set of contacts 48 is shown which is provided for, and actuated by, the number wheel 203, said set of contacts preparing an electric current circuit for the driving electro-magnet 42 of the number wheel 204. On a bridge 219, a contact control lever 220 is mounted, the free end 221 of which is bent in such a way that it extends into number wheel 203. Arranged on the body of the number wheel 203 and between its values 9 and 0 is a projection 222a adapted to act on the contact control lever 220 so as to urge the same towards the left hand side as viewed in Fig. 18. This causes the contact control lever 220 to engage a hook 222, which is tiltably mounted on a support 223 fixed to the bridge 219. Hook 222 is loaded by a spring 224. In its tilted position, the contact control lever 220 urges the set of contact springs 48 together, whereby a current conducting connection is formed as long as the contact control lever 220 is held by the hook 222.

Lever 225 is mounted on an extension of support 223. One arm of lever 225 lies beneath the free end of the hook 222 and the other arm of lever 225 bears against a cam disc 226 rigidly connected to the number wheel 204 for the next higher digit. When the number wheel 204 is rotated by one step, lever 225 is tilted once by one of the cams of the cam disc 226, whereby the hook 222 is tilted against the action of its spring 224. This causes hook 222 to release the contact control lever 220 so that the same returns to its initial position in which the contact springs 48 do not engage each other.

Thus, when the number wheel 203 passes from the value 9 to the value 0, the contact between the contact springs 48 is closed whereby the electric circuit for an additional excitation of the electro-magnet 42 driving the number wheel 204 for the next higher digit is prepared by placing an electric potential on to the contact 49 of the row of contact members 52 (Fig. 16).

The wiper 7 electrically connected to the electro-magnet 42 for driving the second-digit number wheel 204 of the counting device reaches the contact 49 at the end of its operative movement. If, in the meantime, an electric potential has been placed on contact 49 by means of the contact 48 of the first-digit number wheel 203 of the counting device, then the electro-magnet 42 receives an additional impulse and the second-digit number wheel 204 is stepped forwards by one step. Thereby contact 48 is opened again. The second-digit number wheel 204 operated by the electro-magnet 42, on stepping from 9 to 0, operates a contact 54 which places an electric potential on an additional contact 55 in the row of contact members 53. The wiper 8, which is electrically connected to the electro-magnet 43 for driving the number wheel 205 for the third digit engages the additional contact 55 at the end of its operative movement, whereby the electro-magnet 43 causes the third-digit number wheel 205 to perform an additional step.

The additional contacts 49 and 55 of the switching drum 3 are connected to contact rings 56 (Fig. 13) which are permanently engaged by brushes 57 (see also Fig. 10). This permits to place a potential on the contacts of the switching drum 3 by means of counting devices arranged outside the switching drum 3.

The rows of contact members 51, 52, 53 of each side wall of the switching drum 3 correspond to a different number of tickets to be dispensed. On each side wall within the group corresponding to one ticket value, as many contacts are characterized by the application of current conducting U-shaped members 38 as correspond to the product of the number of tickets to be dispensed by the value of each ticket of this kind. By rotating the switching drum 3 by means of the electro-magnet 12 thus the multiplicator for the number of tickets of each kind can be pre-set.

Assuming, for example, the value of one kind of tickets is 24 which to be selected by operating the respective key lever 140 and thereby setting the wiper 40 so that it is in electric contact with the bus bar 46 (Fig. 16). The electrically conducting strips 33 at the first side wall of the switching drum 3 connected to the bus are, at the first side provided with electrically conducting U-shaped members 38 arranged in such a manner that four contacts are formed in the unit row 51 and in two contacts the tens row 52 which contacts are connected to the bus bar 46. On the second side wall of the switching drum 3 the U-shaped members 38 are arranged in such a manner that eight contacts are formed in the unit row or column and four contacts are formed in the tens row or column which are connected to the bus bar 46, and so on. On the sixth side wall of the switching drum 3 the U-shaped contact members are arranged in such a manner that in accordance with the product $6 \times 24 = 144$ four contacts are formed in the unit row, four contacts in the tens row and one contact in the hundreds row, which are all connected to the bus bar 46.

By rotating the switching drum 3 through several steps, the product which results from the multiplication of the corresponding steps through which the switching drum is being rotated by the value of the selected kind of tickets is immediately formed. This rotation of the switching drum 3 is caused by the same current impulses which determine the number of the tickets to be dispensed.

These current impulses are generated by control dial 261 (Figs. 5 and 6) which is used to obtain the desired number of tickets selected by one of the levers 140. This control dial is of well known construction and is operated in the conventional manner by engaging one of the apertures with the finger and rotating the same to the stop 262 whereupon the dial is released and returns to a condition of rest. During the return movement an impulse wheel 263 (Figs. 7–9) is rotated the speed of which is controlled by a governor 266. This impulse wheel is coacting with contact springer 264 which are connected to an impulse circuit including switching magnet 121 (Fig. 1) and switching magnet 12 (Fig. 10). This impulse circuit is connected to the electric source by a contact 265 which is actuated in known manner as long as dial 261 is out of rest. Thus the switching magnets 12 and 121 are actuated simultaneously by electric impulses generated by control dial 261; on each actuation these magnets switch the shaft 115 of the delivery device and the shaft 1 of drum 3 one step.

The dial 261 can be arranged in the casing of the ticket-dispensing device as shown in Fig. 6 or in a separate casing 271 (Fig. 5) which is connected to the dispensing device by means of an electric cable 272.

Of course, as an alternative, the rotation of the switching drum 3 may be effected manually in accordance with the selected number of tickets. In this case the rotatable shaft 1 of the switching drum 3 is connected by means of a suitable gear to the shaft 115 (Figs. 1 and 3) of the feed rollers 105 so that each rotation of the switching drum through one or more steps causes rotation of that feed roller, which is coupled to the shaft 115 on selecting the value of the tickets through a corresponding number of tickets. In this case the electro-magnets 121 (Fig. 1) and 12 (Fig. 10) as well as the dial 261 (Figs. 7 to 9) may be dispensed with.

On operation of the dispensing handle 168 (Fig. 1) the shaft 170 is rotated. This shaft 170 (Figs. 1 and 17) carries pawls 227 in known manner which on rotation of the shaft 170 engage heart-shaped cams (not shown) for the individual number wheels. During the displacement of the number wheels thus effected, the contacts 48 and 54 for the transfer mechanism must not be actuated. For this purpose, the bridge 219 is mounted on a spindle 229 so as to be tiltable against the action of a spring 230. On rotation around the spindle 229, the free ends 221 of the contact control lever 220 is tilted out of the path of the projection 222a, whereby it is no longer influenced by said projection.

For operating the device the operator actuates one of the keys 140 coordinated to the tickets of the desired value. On actuation of key 140 the delivery means of the tickets is coupled with shaft 115; by means of lever 155 and shaft 157 wiper 40 is set mechanically on one of the rings 2 coordinated to the desired value and electrically connected to the appropriate bus bar of the bus bars 44—47 (Fig. 16). Now the operator actuates dial 261 according to the desired number of tickets. During the return movement of dial 261 impulse wheel 263 actuates impulse contact 264. The impulses thus generated actuate magnets 12 and 121 simultaneously. Magnet 12 rotates switching drum 3 step by step preparing the contact rows of one of the side walls of the drum for impulse emitting; magnet 121 rotates shaft 115 and feed roller 105 of the delivery means of the selected value step by step which draws the desired number of tickets from the storage roller 101. Thereupon magnet 30 is switched in automatically which causes a movement of wipers 6—8 along the contact rows of the prepared side wall. Wipers 6—8 emit impulses on striking contacts which are connected to potential over one of the bus bars 44—47 selected by wiper 40. These impulses influence magnets 41—43 of the counting device thus switching the counting wheels according to the product value of the value of the desired ticket by the number of tickets to be dispensed. Finally handle 168 is actuated by the operator which causes the cutting of the prepared tickets for delivering by means of shaft 174 and knife 176 and causes the restoration of the number wheels of counting device 166 for indicating the total of the value of the tickets dispensed.

In embodiment of Fig. 6, in addition to the counting device 165 for indicating the grand total of the value of the tickets dispensed, and the counting device 166 for indicating the total of value of the tickets dispensed in each case, a counting device 251 is provided which is controlled mechanically or electro-magnetically by coins inserted into slots 250. The handle 252 for dispensing the selected tickets, (opening of the dispensing chute 179, cutting off of the tickets and zeroising the counting device 166) can only be operated if the value of the inserted coins equals the value of the selected tickets, that is to say of the counting devices 251 and 166 indicate the same amount. This is effected by a blocking device illustrated in Figs. 20 to 22.

Figure 20:
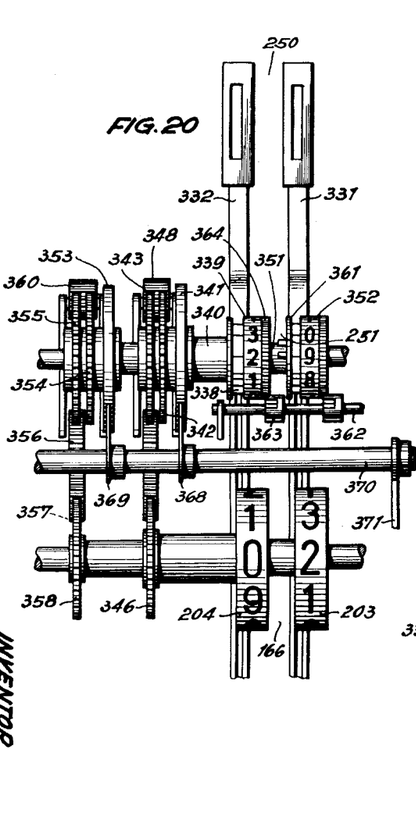
Figs. 20 and 21 are front and side views of a control device operated in the manner of a slot machine.
Figures 21, 22:
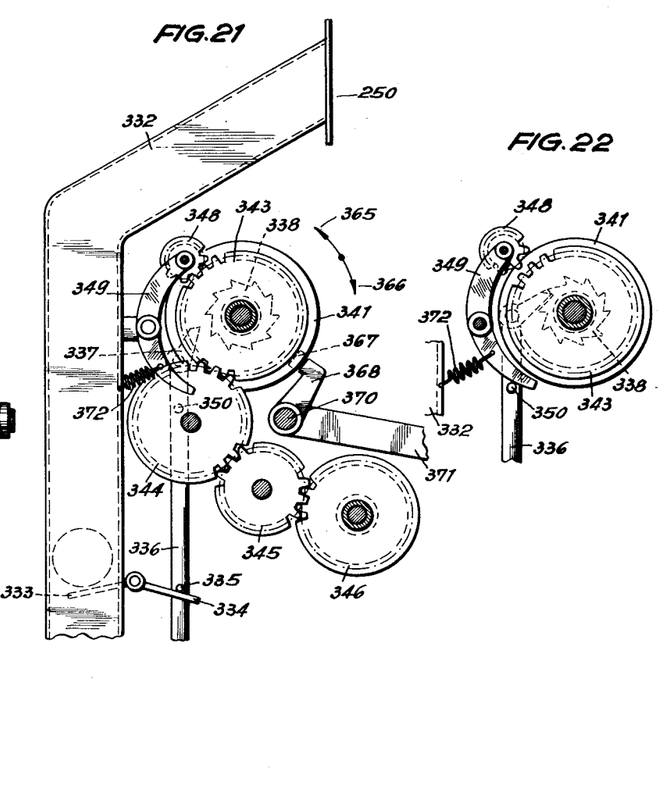
Fig. 22 illustrates a detail of the device of Figs. 20 and 21.

The structure shown in Figs. 20 and 21 comprises two chutes 331 and 332 for coins, each for coins of different value. A flap 333 extends into each of the coin chutes. This flap 333 is adapted to act by its rear arm 334 on a pin 335 of a slide 336 which, in turn, steps by means of pawl 337 a toothed wheel 338 forming an integral part of a number wheel 339 of the counting device 251. The number wheel 339 and the toothed wheel 338 are rigidly connected by means of a hollow shaft 340 to a cam disc 341 and a coupling toothed wheel 342. A further toothed wheel 343 is arranged immediately beside the coupling toothed wheel, 342, the toothed wheel 343 being coupled to the number wheel 204 of the counting device 166 by means of intermediate wheels 344, 345 and 346. The two toothed wheels 342 and 343 lying adjacent each other can be coupled together by means of a pinion 348. This pinion 348 is mounted on a tiltable arm 349. As long as the slide 336 is in its initial position shown, the pinion 348 engages the toothed wheels 342 and 343. However, when the slide 336 is lifted, a pin 350 thereof acts on the lower end of the tiltable arm 349 and tilts the same against the action of a spring 372 so that the pinion 348 disengages the toothed wheels 342 and 343 (Fig. 22).

In a corresponding manner, a number wheel 352 associated with the coin chute 331 is connected to a cam disc 353 and a toothed wheel 354 by means of a shaft 351. The toothed wheel 354 is arranged independently from and adjacent a toothed wheel 355 which is coupled to the number wheel 203 of the counting device 166 by means of intermediate wheels 356, 357 and 358. The wheels 354 and 355 can be coupled together by means of a pinion 360.

A disc 361 provided with pins is connected to number wheel 352. Disc 361 effects the transfer of movement to the number wheel 339 by means of an auxiliary shaft 362 in a manner which is known per se. During such transfer the pinion 363 engages a toothed wheel 364 connected to the number wheel 339.

The number wheels 203 and 204 of the counting device 166 for indicating the value of tickets dispensed on each operation are set as described above on selecting the tickets to be dispensed and thus indicate the value which is to be paid for such dispensing. This setting is transferred by means of the intermediate wheels to the number wheels 339 and 352, the setting of the number wheels 339 and 352 being effected in the direction of the arrow 365 (Fig. 21), that is to say in the direction opposite to that in which the number wheels are rotated by stepping pawl 337 of the slide 336. When, on insertion of a coin, one of the number wheels is stepped forwards by means of the stepping pawl 337, then such wheel is rotated in the direction of the arrow 336 (Fig. 21). Thus, the original setting of the number wheels 339 and 352 is counteracted by the subsequent insertion of coins into the coin chutes 331 and 332. After coins have been inserted corresponding to the same total value by which the counting device for counting the value of the tickets to be dispensed on each operation had originally been stepped forward, both number wheels 339 and 352 indicate again the value 0.

The cam discs 341 and 353 which are rigidly connected respectively to the number wheel 339 and 352 are each provided with a recess 367. Sensing levers 368 and 369 bear against the circumference of the said cam discs, the levers 368 and 369 being connected to a locking lever 371 by means of a shaft 370. In the position shown in Fig. 21 the locking lever 371 locks the actuating device (not shown) for dispensing the tickets. After both number wheels 339 and 352 have been stepped back into their zero positions, the recesses 367 of both cam discs 341 and 353 register with the free ends of the sensing levers 368 and 369 so that the same can enter these recesses. Thereby the locking lever 371 is tilted around its shaft 370 and the dispensing device is released.

Thus, the arrangement described, makes it possible to dispense tickets depending only upon insertion of coins of the appropriate value, and independently of whether this value is inserted in coins of one or of different kinds.

As an alternative, the device illustrated in Figs. 20 to 22 may also be used in such a manner that on insertion of the individual coin the number wheels 339 and 352 of the counting device 251 and the cam discs 341 and 353 connected thereto are first rotated out of their zero position corresponding to the value of the inserted coins. When, subsequently, the value of the tickets is selected in accordance with the value of the coins inserted, that is to say according to the sum indicated by the counting device, then the counting device 166 is stepped according to such value which, by means of the transfer mechanism, returns the number wheels 339 and 352 of the counting device 251 in opposite direction back into their zero positions.

If, for any reason, the value of the tickets to be dispensed is larger than the value of the coins inserted, then the dispensing handle 252 cannot be operated. In such a case, the number wheels for the coin chutes are stepped beyond their zero position by the counting device indicating the value of the tickets to be dispensed in each case by the difference existing between the said number wheels and the counting device indicating the value of the tickets. Only when by inserting additional coins the correct value of coins has been inserted, can dispensing of the tickets be effected.

It should be clearly understood that the arrangements described and illustrated are given by way of example. Many modifications, additions and omissions are possible without departing from the spirit of this invention.

I claim:

1. A device for dispensing tickets of different values comprising a plurality of means each for storing and delivering tickets of one value, means for selecting the value of the tickets by rendering effective one of the said storing and delivering means, further means common to all the said storing and delivering means for selecting the number of tickets of the selected value to be dispensed, at least one electro-magnetically actuatable counting device for indicating the total value of tickets dispensed, and means for emitting a number of electric impulses corresponding to the total value of tickets selected in each case for actuating the said counting device, said emitting means comprising means for storing a plurality of precomputed product values, and means controlled jointly by said first and second selecting means for selecting predetermined product values in accordance with the tickets dispensed.

2. A device as claimed in claim 1, wherein said impulse emitting means comprises a plurality of wipers, a number of groups of contact members corresponding to the number of tickets to be dispensed selectable by said further selecting means, a plurality of rows of contact members within each of said groups, each said row of contact members being arranged for co-operation with one of said plurality of wipers, means for applying an electric potential to contact members of said plurality of rows of contact members so that contact members thereof under potential represent the product of the value of the tickets selected by said first selecting means multiplied by the number of tickets selected by said second selecting means, and means for sweeping said wipers across said plurality of rows of contact members for emitting electric impulses.

3. A device as claimed in claim 1, wherein said impulse emitting means comprises a plurality of wipers, a number of groups of contact members corresponding to the number of tickets dispensed selectable by said further selecting means, a plurality of rows of contact members within each of said groups, each of said plurality of rows of contact members being arranged for co-operation with one of said plurality of wipers, a further wiper for applying an electric potential to contact members of said plurality of rows of contact members so that contact members under potential represent the product of the value of the tickets selected by said first selecting means multiplied by the number of tickets selected by said second selecting means, means for sweeping said plurality of wipers across rows of contact members of the selected group for emitting electric impulses, and means for displacing said further wiper for applying an electric potential in dependence on the value of tickets selected by the said first selecting means.

4. A device as claimed in claim 1, wherein said impulse emitting means comprises a plurality of wipers, a number of groups of contact members corresponding to the number of tickets to be dispensed selectable by said further selecting means, a plurality of rows of contact members within each of said groups each row of said plurality of rows of contact members being arranged for co-operation with one of said plurality of wipers, a plurality of bus bars, each bus bar being electrically connected to contacts of all groups of contact members corresponding to one value of tickets, means for selecting a bus bar in dependence on the value of the tickets selected by the said first selecting means, and means for sweeping said wipers across row of contacts for emitting electric impulses.

5. A device as claimed in claim 1, wherein said impulse emitting means comprises a plurality of wipers, a number of groups of contact members corresponding to the number of tickets to be dispensed selectable by said further selecting means, a plurality of rows of contact members within each of said groups, each row of said plurality of rows of contact members being arranged for co-operation with one of said plurality of wipers, each row of said plurality of rows of contact members corresponding to a different number of tickets selectable by said second selecting means, means for applying an electric potential to contact members of said rows so that contact members under potential represent the product of the value of the the tickets selected by said first selecting means multiplied by the number of tickets selected by said second selecting means, means for sweeping said wipers across rows of contact members for emitting electric impulses, each group of said plurality of rows of contact members corresponding to a number of tickets selectable by said second selecting means being subdivided according to decadic digits of numbers, a plurality of electro-magnets, and a plurality of number wheels in said counting device, each number wheel corresponding to a decadic digit of a number, each electro-magnet being arranged for operating one of said number wheels, and said electro-magnets being arranged for responding to the impulses emitted by said impulse emitting means.

6. A device as claimed in claim 1, wherein said impulse emitting means comprises a plurality of wipers, a number of groups of contact members corresponding to the number of tickets to be dispensed selectable by said further selecting means, and a plurality of rows of contact members within each of said groups, each row of said plurality of rows of contact members being arranged for co-operation with one of said plurality of wipers, means for applying an electric potential to contact members of said rows so that contact members under potential represent the product of the value of the tickets selected by said first selecting means multiplied by the number of tickets selected by said second selecting means, means for sweeping said wipers across rows of contact members for emitting electric impulses, each group of contact members corresponding to a number of tickets selectable by said second selecting means being subdivided according to decadic digits of numbers, a plurality of electro-magnets, and a plurality of number wheels in said counting device, each number wheel corresponding to a decadic digit of a number, each electro-magnet being arranged for operating one of said number wheels, said electro-magnets being arranged for responding to the impulses emitted by the impulse emitting means, and the rows of contact members which correspond to different decadic digits of numbers being arranged side by side.

7. A device as claimed in claim 1, wherein said impulse emitting means comprises a plurality of wipers, a number of contact members corresponding to the number of tickets to be dispensed selectable by said further dispensing means, a plurality of rows of contact members within each of said groups, each row of said plurality of rows of contact members being arranged for co-operation with one of said plurality of wipers, means for applying an electric potential to contact members of said plurality of rows of contact members so that contact members under potential represent the product of the value of the tickets selected by said first selecting means multiplied by the number of tickets selected by said second selecting means, means for sweeping said wipers across said plurality of rows of contact members for emitting electric impulses, a plurality of electrically conducting strips, a plurality of electrically insulating strips, said conducting strips, and said insulating strips being superimposed to form a stack wherein adjacent conducting strips are separated from each other by at least one insulating strip, and a plurality of U-shaped electrically conducting members each releasably attached to a conducting strip, said U-shaped member constituting the contact members of said plurality of rows of contact members.

8. A device as claimed in claim 1, wherein said impulse emitting means comprises a plurality of wipers, a number of contact members corresponding to the number of tickets to be dispensed selectable by said further dispensing means, and a plurality of rows of contact members within each of said groups, each row of said plurality of rows of contact members being arranged for co-operation with one of said plurality of wipers, means for applying an electric potential to contact members of said plurality of rows of contact members so that contact members under potential represent the product of the value of the tickets selected by said first selecting means multiplied by the number of tickets selected by said second selecting means, means for sweeping said wipers across rows of contact members for emitting electric impulses, a plurality of electrically conducting strips, a plurality of electrically insulating strips, said conducting strips and said insulating strips being superimposed to form a stack wherein adjacent conducting strips are separated from each other by at least one insulating strip, and a plurality of U-shaped electrically conducting members each releasably attached to one of said plurality of conducting strips, said plurality of U-shaped members constituting the contact members of said rows of contact members, those of said plurality of insulating strips lying immediately adjacent conducting strips of said plurality of conducting strips being provided with marginal recesses for facilitating the releasable attachment of said plurality of U-shaped members to the conducting strips of said plurality of conducting strips.

9. A device as claimed in claim 1, wherein said impulse emitting means comprises a plurality of wipers, a number of contact members corresponding to the number of tickets to be dispensed selectable by said further dispensing means, a plurality of rows of contact members within each of said groups each row of said plurality of rows of contact members being arranged for co-operation with one of said plurality of wipers, means for applying an electric potential to contact members of said plurality of rows of contact members so that contact members under potential represent the product of the value of the tickets selected by said first selecting means multiplied by the number of tickets selected by said second selecting means, means for sweeping said plurality of wipers across said plurality of rows of contact members for emitting electric impulses, a plurality of electrically conducting strips, a plurality of electrically insulating strips, the conducting strips and the insulating strips of said plurality of conducting strips and of said plurality of insulating strips being superimposed to form a stack wherein adjacent conducting strips are separated from each other by at least one insulating strip, and a plurality of U-shaped electrically conducting members each releasably attached to one of said plurality of conducting strips, said plurality of U-shaped members constituting the contact members of said plurality of rows of contact members, those of said plurality of insulating strips lying immediately adjacent conducting strips being provided with marginal recesses for facilitating the releasable attachment of said plurality of U-shaped members to said plurality of conducting strips, adjacent strips of said plurality of insulating strips being provided with recesses separated from each other by an additional insulating strip for electrically insulating from each other U-shaped members of said plurality of U-shaped members which are attached to adjacent conducting strips of said plurality of conducting strips.

10. A device as claimed in claim 1, wherein said impulse emitting means comprises a plurality of wipers, a number of contact members corresponding to the number of tickets to be dispensed selectable by said further dispensing means, and a plurality of rows of contact members within each of said groups, each of said plurality of rows of contact members being arranged for co-operation with one of said plurality of wipers, means for applying an electric potential to contact members of said plurality of rows of contact members so that contact members under potential represent the product of the value of the tickets selected by said first selecting means multiplied by the number of tickets selected by said second selecting means, means for sweeping said plurality of wipers across said plurality of rows of contact members for emitting said electric impulse, a rotatable polygonal drum, said groups of contact members being provided on different side walls of said polygonal drum, and means for rotating said drum relative to said plurality of wipers on operating said second selecting means to enable said plurality of wipers to sweep across rows of appropriate groups of contact members.

11. A device as claimed in claim 1, wherein said impulse emitting means comprises a plurality of wipers, a number of contact members corresponding to the number of tickets to be dispensed selectable by said further dispensing means, a plurality of rows of contact members within each of said groups, each of said plurality of rows of contact members being arranged for co-operation with one of said plurality of wipers, means for applying an electric potential to contact members of said plurality of rows of contact members so that contact members under potential represent the product of the value of the tickets selected by said first selecting means multiplied by the number of tickets selected by said second selecting means, means for sweeping said plurality of wipers across said plurality of rows of contact members for emitting said electric impulses, a rotatable polygonal drum, said groups of contact members being provided on different side walls of said drum, electro-magnetically controlled means for rotating said drum step-by-step relative to said plurality of wipers on operating said second selecting means to enable said plurality of wipers to sweep across rows of the appropriate groups of said plurality of rows of contact members, and spring means for returning said drum to the initial position therof.

12. A device as claimed in claim 1, wherein said impulse emitting means comprises a plurality of wipers, a number of groups of contact members corresponding to the number of tickets to be dispensed selectable by said further dispensing means, a plurality of rows of contact members within each of said groups, each of said plurality of rows of contact members being arranged for co-operation with one of said plurality of wipers, means for applying an electric potential to contact members of said plurality of rows of contact members so that contact members under potential represent the product of the value of the tickets selected by said first selecting means multiplied by the number of tickets selected by said second selecting means, means for sweeping said plurality of wipers across said plurality of rows of contact members for emitting said electric impulses, a rotatable polygonal drum, said groups of contact members being provided on different side walls of said drum, electro-magnetically controlled means for rotating said drum step-by-step relative to said plurality of wipers on operating said second selecting means to enable said plurality of wipers to sweep across rows of appropriate groups of contact members, spring means for returning said drum to the initial position thereof, and a dial sending electric impulses to thereby simultaneously control the electro-magnetically controlled drum rotating means and said second selecting means.

13. A device as claimed in claim 1, wherein said impulse emitting means comprises a plurality of wipers, a number of groups of contact members selectable by said further selecting means and a plurality of rows of contact members within each of said groups, each of said plurality of rows of contact members being arranged for co-operation with one of said plurality of wipers, means for applying an electric potential to contact members of said plurality of rows of contact members so that contact members under potential represent the product of the value of the tickets selected by said first selecting means multiplied by the number of tickets selected by said second selecting means, means for sweeping said plurality of wipers across rows of said plurality of rows of contact members for emitting said electric impulses, a rotatable polygonal drum, said groups of contact members being provided on different side walls of said drum, electro-magnetically controlled means for rotating said drum step-by-step relative to said plurality of wipers on operating said second selecting means to enable said plurality of wipers to sweep across rows of the appropriate groups of contact members, spring means for returning said drum to the initial position thereof, an electro-magnetically controlled lever, a ratchet wheel connected to said drum, and two pawls for rotating said ratchet wheel and said drum in a step-by-step manner, said electro-magnetically controlled lever on being actuated releasing said pawls from said ratchet wheel to enable said drum to return to the initial position thereof.

14. A device as claimed in claim 1, wherein said impulse omitting means comprises a plurality of wipers, a number of groups of contact members corresponding to the number of tickets selectable by said further selecting means, a plurality of rows of contact members within each of said groups, each of said plurality of rows of contact members being arranged for co-operation with one of said plurality of wipers, means for applying an electric potential to contact members of said plurality of rows of contact members so that contact members under potential represent the product of the value of the tickets selected by said first selecting means multiplied by the number of tickets selected by said second selecting means, means for sweeping said plurality of wipers across said plurality of rows of contact members for emitting said electric impulses, a rotatable polygonal drum, said groups of contact members being provided on different side walls of said drum, means for rotating said drum relative to said plurality of wipers on operating said second selecting means to enable said plurality of wipers to sweep across rows of appropriate groups of contact members, a plurality of electrically conducting strips, a plurality of electrically insulating strips, conducting strips of said plurality of conducting strips and insulating strips of said plurality of insulating strips being superimposed so that adjacent conducting strips are insulated from each other by intermediate insulating strips, said conducting and insulating strips forming a staple constituting said drum, and a plurality of U-shaped contact members releasably applied to said plurality of conducting strips to form the members of said rows of contact members, the number of U-shaped contact members provided on each side wall of said drum determining a number to be transmitted to said counting device.

15. A device as claimed in claim 1, wherein said impulse emitting means comprises a plurality of wipers, a number of groups of contact members corresponding to the number of tickets to be dispensed selectable by said further selecting means, and a plurality of rows of contact members within each of said groups, each of said plurality of rows of contact members being arranged for co-operation with one of said plurality of wipers, means for applying an electric potential to contact members of a plurality of rows of contact members so that contact members under potential represent the product of the value of the tickets selected by said first selecting means multiplied by the number of tickets selected by said second selecting means, means for sweeping said plurality of wipers across said plurality of rows of contact members for emitting said electric impulses, a rotatable polygonal drum, said groups of contact members being provided on different side walls of said drum, means for rotating said drum relative to said plurality of wipers on operating said second selecting means to enable said plurality of wipers to sweep across rows of appropriate groups of contact members, a plurality of electrically conducting strips, a plurality of electrically insulating strips, strips of said plurality of conducting strips and insulating strips of said plurality of insulating strips being superimposed so that adjacent conducting strips are insulated from each other by intermediate insulating strips, said conducting strips and insulating strips forming a staple constituting said polygonal drum, a plurality of U-shaped contact members releasably applied to said conducting strips to form the members of said rows of contact members, the number of U-shaped contact members provided on each side wall of said drum determining a number to be transmitted to said counting device, and a plurality of bus bars, groups of conducting strips being connected to said bus bars, each to one, the arrangement being such that the number to be transmitted to said counting device corresponds in each case to the product of the value selected by said first selecting means multiplied by the number of tickets selected by said second selecting means.

16. A device as claimed in claim 1, comprising a plurality of selecting means, a plurality of key levers for selectively coupling the selecting means to the delivering means, one to each, means for blocking all but one key lever, when the said one key lever has been operated, a plurality of rows of contact members within each of said groups, a plurality of bus bars each corresponding to one of a plurality of selectable values of the tickets, and connected to corresponding one or more contacts of the contact rows of each of said groups corresponding to the various product values, a wiper for effecting an electric connection to one of the bus bars, and a link between said wiper and each key lever for displacing the wiper and thereby effecting the electric connection to one of the bus bars in dependence on which key lever has been operated.

17. A device as claimed in claim 1 in which said means for selecting the value of the tickets comprise a plurality of key levers for selectively coupling the delivering means to a common shaft, one to each.

18. A device as claimed in claim 1 in which said means for selecting the value of the tickets comprise a plurality of key levers for selectively coupling the delivering means to a common shaft, one to each, a contact for closing a starting circuit for said impulse emitting means, and means actuated by each of said keys for actuating said contact on actuation of one of said keys.

References Cited in the file of this patent

UNITED STATES PATENTS

| | | |
|---|---|---|
| 1,160,669 | Swift | Nov. 16, 1915 |
| 1,313,958 | Skerl | Aug. 26, 1919 |
| 1,336,628 | Hughes | Apr. 13, 1920 |
| 1,371,138 | Bair | Mar. 8, 1921 |
| 1,382,685 | Skerl | June 28, 1921 |
| 1,761,386 | Davis | June 3, 1930 |
| 1,819,195 | Ohmer | Aug. 18, 1931 |
| 1,902,035 | Lake | Mar. 21, 1933 |
| 2,323,255 | Sutherland | June 29, 1943 |
| 2,385,007 | Leathers et al. | Sept. 18, 1945 |
| 2,564,575 | Just | Aug. 14, 1951 |